(12) United States Patent
Jito et al.

(10) Patent No.: US 11,094,924 B2
(45) Date of Patent: Aug. 17, 2021

(54) NONAQUEOUS ELECTROLYTE SECONDARY BATTERIES

(71) Applicant: Panasonic Intellectual Property Management Co., Ltd., Osaka (JP)

(72) Inventors: Daizo Jito, Osaka (JP); Akihiro Kawakita, Hyogo (JP); Takeshi Ogasawara, Hyogo (JP)

(73) Assignee: PANASONIC INTELLECTUAL PROPERTY MANAGEMENT CO, LTD., Osaka (JP)

( * ) Notice: Subject to any disclaimer, the term of this patent is extended or adjusted under 35 U.S.C. 154(b) by 695 days.

(21) Appl. No.: 15/735,819

(22) PCT Filed: Jul. 28, 2016

(86) PCT No.: PCT/JP2016/003499
§ 371 (c)(1),
(2) Date: Dec. 12, 2017

(87) PCT Pub. No.: WO2017/022222
PCT Pub. Date: Feb. 9, 2017

(65) Prior Publication Data
US 2020/0052289 A1 Feb. 13, 2020

(30) Foreign Application Priority Data
Aug. 6, 2015 (JP) .............. JP2015-156220

(51) Int. Cl.
*H01M 4/00* (2006.01)
*H01M 4/36* (2006.01)
(Continued)

(52) U.S. Cl.
CPC ........... *H01M 4/364* (2013.01); *H01M 4/485* (2013.01); *H01M 4/525* (2013.01)

(58) Field of Classification Search
CPC ....... H01M 4/364; H01M 4/485; H01M 4/525
See application file for complete search history.

(56) References Cited

U.S. PATENT DOCUMENTS

| | | | |
|---|---|---|---|
| 2006/0177739 A1 | 8/2006 | Endo et al. | |
| 2011/0165460 A1 | 7/2011 | Jito et al. | |

(Continued)

FOREIGN PATENT DOCUMENTS

| | | |
|---|---|---|
| CN | 102117934 A | 7/2011 |
| CN | 103594692 A | 2/2014 |

(Continued)

OTHER PUBLICATIONS

International Search Report dated Nov. 1, 2016, issued in counterpart International Application No. PCT/JP2016/003499 (2 pages).

(Continued)

*Primary Examiner* — Milton I Cano
*Assistant Examiner* — Mary G Henshaw
(74) *Attorney, Agent, or Firm* — Westerman, Hattori, Daniels & Adrian, LLP

(57) ABSTRACT

An object of the present invention is to provide a nonaqueous electrolyte secondary battery that can attain a smaller increase in direct current resistance after charge discharge cycles. An aspect of the invention resides in a nonaqueous electrolyte secondary battery wherein a positive electrode active material includes a secondary particle formed by aggregation of primary particles of a lithium transition metal oxide, and a secondary particle formed by aggregation of primary particles of a rare earth compound. On a surface of the secondary particle of the lithium transition metal oxide, the secondary particle of the rare earth compound is attached to a recess formed between adjacent primary particles of the lithium transition metal oxide in such a manner that the secondary particle of the rare earth compound is attached to (Continued)

each of the primary particles forming the recess. The lithium transition metal oxide includes magnesium dissolved therein.

8 Claims, 3 Drawing Sheets

(51) Int. Cl.
*H01M 4/485* (2010.01)
*H01M 4/525* (2010.01)

(56) References Cited

U.S. PATENT DOCUMENTS

| | | |
|---|---|---|
| 2014/0050993 A1 | 2/2014 | Park |
| 2015/0221942 A1 | 8/2015 | Sugaya et al. |
| 2015/0340683 A1 | 11/2015 | Hamano et al. |
| 2016/0006029 A1 | 1/2016 | Sugaya et al. |

FOREIGN PATENT DOCUMENTS

| | | |
|---|---|---|
| JP | 2011-159619 A | 8/2011 |
| JP | 2014-38828 A | 2/2014 |
| WO | 2005/008812 A1 | 1/2005 |
| WO | 2014/049958 A1 | 4/2014 |
| WO | 2014/097569 A1 | 6/2014 |
| WO | 2014/156054 A1 | 10/2014 |

OTHER PUBLICATIONS

English Search Report dated Mar. 26, 2020, issued in counterpart CN Application No. 201680040775.9 (2 pages).

NONAQUEOUS ELECTROLYTE SECONDARY BATTERIES

TECHNICAL FIELD

The present disclosure relates to nonaqueous electrolyte secondary batteries.

BACKGROUND ART

In recent years, nonaqueous electrolyte secondary batteries are required to have an increased capacity so that they can be used for a long period of time, and are also required to be enhanced in output characteristics so that they can be charged and discharged repeatedly at a large current in a relatively short time.

For example, Patent Literature 1 suggests that a Group III element in the periodic table that is present on the surface of base particles as a positive electrode active material can restrain reaction between the positive electrode active material and an electrolytic solution from occurring even when the charge voltage is increased, and can reduce a deterioration in charge storage characteristics.

Patent Literature 2 suggests that dissolving magnesium (Mg) into a positive electrode active material decreases the crystallinity of the positive electrode and thus can improve discharge performance.

CITATION LIST

Patent Literature

PTL 1: WO 2005/008812
PTL 2: WO 2014/097569

SUMMARY OF INVENTION

Technical Problem

Unfortunately, it has been found that batteries, even with the techniques disclosed in Patent Literatures 1 and 2, suffer an increase in direct current resistance (hereinafter, sometimes written as DCR), in other words, are deteriorated in output characteristics, after being subjected to charge discharge cycles.

It is therefore an object of the present disclosure to provide a nonaqueous electrolyte secondary battery that can attain a smaller increase in DCR after charge discharge cycles.

Solution to Problem

A nonaqueous electrolyte secondary battery according to the present disclosure includes a positive electrode, a negative electrode and a nonaqueous electrolyte, wherein the positive electrode includes a positive electrode active material that includes a secondary particle formed by aggregation of primary particles of a lithium transition metal oxide, and a secondary particle formed by aggregation of primary particles of a rare earth compound. On a surface of the secondary particle of the lithium transition metal oxide, the secondary particle of the rare earth compound is attached to a recess formed between adjacent primary particles of the lithium transition metal oxide in such a manner that the secondary particle of the rare earth compound is attached to each of the primary particles forming the recess. The lithium transition metal oxide includes magnesium dissolved therein.

Advantageous Effects of Invention

The nonaqueous electrolyte secondary battery according to the present disclosure can attain a smaller increase in DCR after charge discharge cycles.

DESCRIPTION OF EMBODIMENTS

Example embodiments will be described in detail below with reference to the drawings.

The present disclosure is not limited to the embodiments discussed herein, and various modifications are possible without departing from the spirit of the present disclosure. The drawings used in the description of the embodiments are only illustrative.

Figure 1:
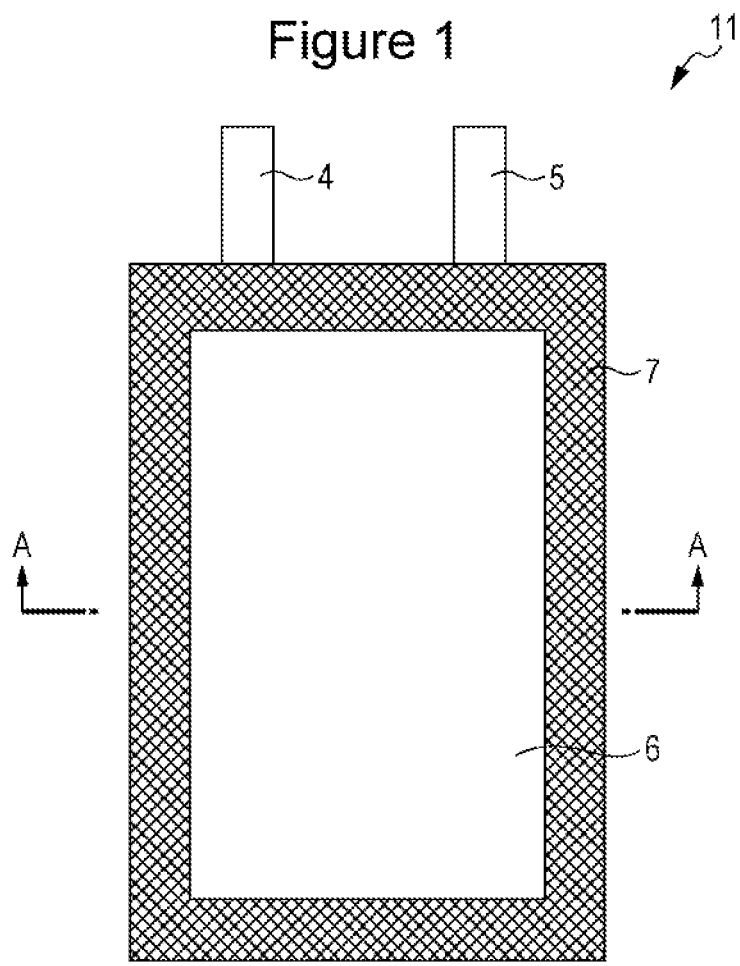
FIG. 1 is a front view of a nonaqueous electrolyte secondary battery according to an example embodiment.
Figure 2:
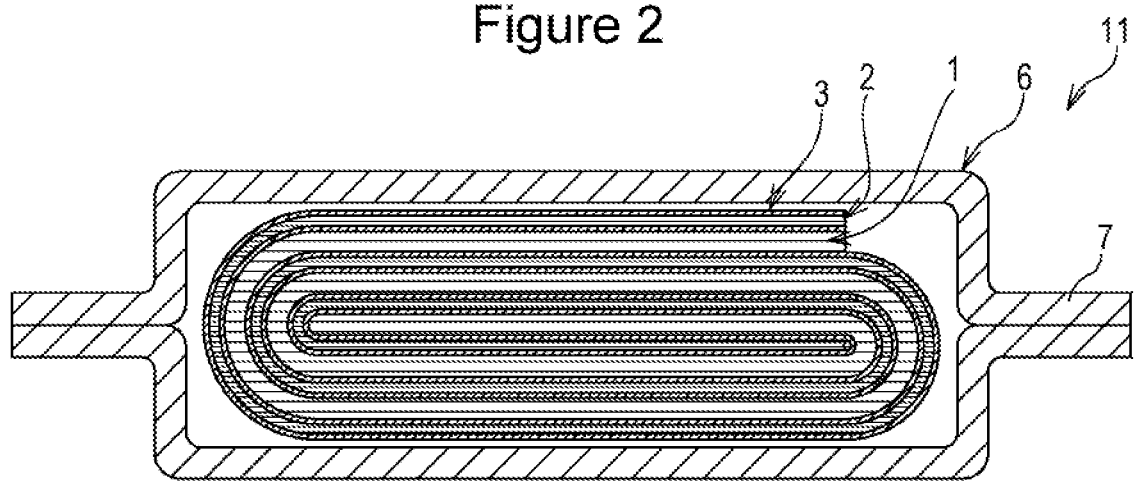
FIG. 2 is a sectional view along line A-A in FIG. 1.

FIG. 1 is a view illustrating a nonaqueous electrolyte secondary battery 11 according to an example embodiment. As illustrated in FIG. 1 and FIG. 2, the nonaqueous electrolyte secondary battery 11 includes a positive electrode 1, a negative electrode 2 and a nonaqueous electrolyte (not shown). The positive electrode 1 and the negative electrode 2 are wound via a separator 3 so as to form, together with the separator 3, a flat electrode assembly. The nonaqueous electrolyte secondary battery 11 includes a positive electrode current collector tab 4, a negative electrode current collector tab 5, and an aluminum laminate case 6 which has a closed portion 7 formed by heat sealing of peripheral regions. The flat electrode assembly and the nonaqueous electrolyte are accommodated in the aluminum laminate case 6. The positive electrode 1 is connected to the positive electrode current collector tab 4, and the negative electrode 2 to the negative electrode current collector tab 5. The structure thus formed is chargeable and dischargeable as a secondary battery.

While the example shown in FIG. 1 and FIG. 2 illustrates a laminate film pack battery including a flat electrode assembly, the present disclosure may be applied to other types of batteries. The shape of the battery may be, for example, cylindrical, prismatic, coin shape, or the like.

Hereinbelow, constituents of the nonaqueous electrolyte secondary battery 11 will be described in detail.

[Positive Electrodes]

For example, the positive electrode includes a positive electrode current collector such as a metallic foil, and a positive electrode active material layer disposed on the positive electrode current collector. The positive electrode current collector may be, for example, a foil of a metal that is stable at positive electrode potentials such as aluminum, or a film having a skin layer of such a metal. The positive electrode mixture layer includes a positive electrode active material, and preferably further includes a conductive agent and a binder. The positive electrode may be fabricated by, for example, applying a positive electrode mixture slurry including the positive electrode active material and other components such as a conductive agent and a binder onto a positive electrode current collector, and drying and rolling the wet films so as to form positive electrode mixture layers on both sides of the current collector.

The conductive agent may be used to enhance the electrical conductivity of the positive electrode active material layers. Examples of the conductive agents include carbon materials such as carbon black, acetylene black, Ketjen black and graphite. These may be used singly, or two or more may be used in combination.

The binder may be used to enhance the bonding of components such as the positive electrode active material with respect to the surface of the positive electrode current collector while ensuring a good contact between the positive electrode active material and the conductive agent. Examples of the binders include fluororesins such as polytetrafluoroethylene (PTFE) and polyvinylidene fluoride (PVdF), polyacrylonitrile (PAN), polyimide resins, acrylic resins and polyolefin resins. These resins may be used in combination with carboxymethylcellulose (CMC) or salts thereof (such as CMC-Na, CMC-K and CMC-$NH_4$, and partially neutralized salts), polyethylene oxide (PEO) and the like. These may be used singly, or two or more may be used in combination.

Hereinbelow, positive electrode active material particles according to an example embodiment will be described in detail with reference to FIG. 3.

Figure 3:
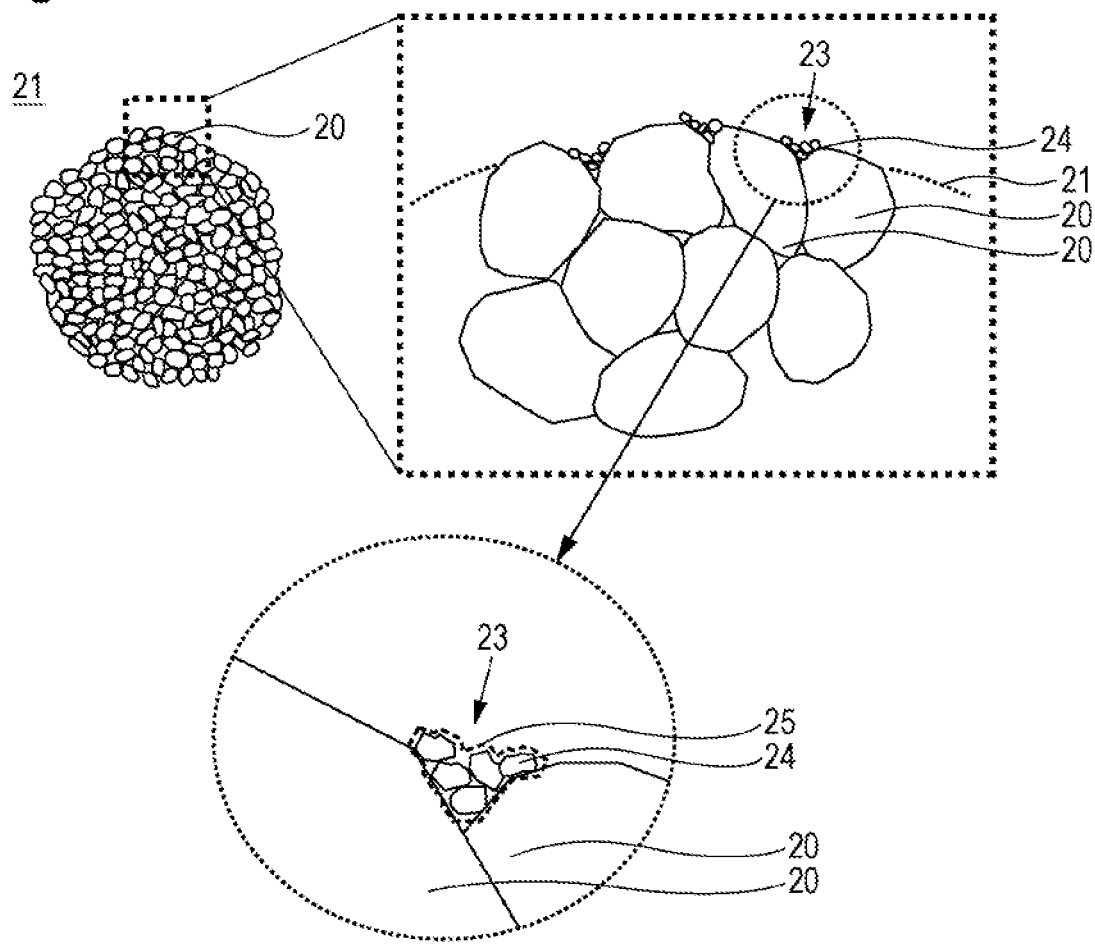
FIG. 3 is a partially enlarged sectional view of a positive electrode active material particle according to an example embodiment.

FIG. 3 is a partially enlarged sectional view of a positive electrode active material particle according to an example embodiment.

As illustrated in FIG. 3, the positive electrode active material particle includes a secondary particle 21 of a lithium transition metal oxide formed by aggregation of primary particles 20 of a lithium transition metal oxide, and a secondary particle 25 of a rare earth compound formed by aggregation of primary particles 24 of a rare earth compound. On the surface of the secondary particle 21 of the lithium transition metal oxide, the secondary particle 25 of the rare earth compound is attached to a recess 23 between adjacent primary particles 20 of the lithium transition metal oxide in such a manner that the secondary particle 25 of the rare earth compound is attached to each of the primary particles 20 forming the recess 23. Further, the lithium transition metal oxide that constitutes the positive electrode active material particles includes magnesium (Mg) dissolved therein. The concentration of Mg dissolved in the lithium transition metal oxide is preferably not less than 0.03 mol % and not more than 0.5 mol % relative to the total molar amount of metal element(s) except lithium.

Here, the phrase that the secondary particle 25 of the rare earth compound is attached to each of the primary particles 20 of the lithium transition metal oxide forming the recess 23 means that the secondary particle 25 is attached to the surface of at least two primary particles 20 that are adjacent to one another in the recess 23. For example, the positive electrode active material particles of the present embodiment are such that in a cross section of the particle of the lithium transition metal oxide, the secondary particle 25 of the rare earth compound is attached to the surface of both of two primary particles 20 that are adjacent to each other on the surface of the secondary particle 21 of the lithium transition metal oxide. While some of the secondary particles 25 of the rare earth compound may be attached to the surface of the secondary particle 21 other than in the recesses 23, most of the secondary particles 25, for example, not less than 80% or not less than 90%, or substantially 100% of the secondary particles 25 are present in the recesses 23.

In the positive electrode active material particles of the present embodiment, the secondary particles 25 of the rare earth compound that are each attached to both primary particles 20 of the lithium transition metal oxide adjacent to each other suppress surface alteration of the primary particles 20 during charge discharge cycles, with the result that a breakage of the positive electrode active material particles is prevented. In addition, the secondary particles 25 of the rare earth compound probably have an effect of fixing (bonding) adjacent primary particles 20 to one another, and consequently the occurrence of breakage at interfaces of the primary particles in the recesses 23 is suppressed even when the positive electrode active material is repeatedly swollen and shrunk during charge discharge cycles.

Further, Mg dissolved in the lithium transition metal oxide makes it possible to suppress alteration and breakage at interfaces of the primary particles 20 within the secondary particles 21. Specifically, it is probable that the rare earth compound suppresses deterioration at interfaces of the primary particles 20 on the surface of the secondary particles 21, and Mg suppresses deterioration at interfaces of the primary particles 20 in the inside of the secondary particles 21. As a result, the increase in DCR after charge discharge cycles can be reduced and the decrease in output characteristics can be rendered small.

The rare earth compound is preferably at least one compound selected from hydroxides, oxyhydroxides, oxides, carbonate compounds, phosphate compounds and fluoride compounds of rare earths.

The rare earth element constituting the rare earth compound is at least one selected from scandium, yttrium, lanthanum, cerium, praseodymium, neodymium, samarium, europium, gadolinium, terbium, dysprosium, holmium, erbium, thulium, ytterbium and lutetium. Of these, neodymium, samarium and erbium are particularly preferable. Compounds of neodymium, samarium and erbium are particularly excellent in, for example, suppressive effects on surface alteration that can occur on the surface of the secondary particles 21 (at interfaces of the primary particles 20) of the lithium transition metal oxide, as compared to other rare earth compounds.

Specific examples of the rare earth compounds include hydroxides such as neodymium hydroxide, samarium hydroxide and erbium hydroxide, oxyhydroxides such as neodymium oxyhydroxide, samarium oxyhydroxide and erbium oxyhydroxide, phosphate compounds such as neodymium phosphate, samarium phosphate and erbium phosphate, carbonate compounds such as neodymium carbonate, samarium carbonate and erbium carbonate, oxides such as neodymium oxide, samarium oxide and erbium oxide, and fluoride compounds such as neodymium fluoride, samarium fluoride and erbium fluoride.

The average particle size of the primary particles 24 of the rare earth compound is preferably not less than 5 nm and not more than 100 nm, and more preferably not less than 5 nm and not more than 80 nm.

The average particle size of the secondary particles 25 of the rare earth compound is preferably not less than 100 nm and not more than 400 nm, and more preferably not less than 150 nm and not more than 300 nm. If the average particle size of the secondary particles 25 is excessively large, the number of recesses 23 in the lithium transition metal oxide which can accept the secondary particles 25 is decreased, with the result that the decrease in capacity retention after high-temperature cycles cannot be rendered sufficiently small at times. If, on the other hand, the average particle size of the secondary particles 25 is excessively small, the secondary particles 25 have a small area of contact with each of the primary particles 20 in the recesses 23 in the lithium transition metal oxide, and consequently may reduce their effect of fixing (bonding) adjacent primary particles 20 and their effect of suppressing the breakage on the surface of the secondary particles 21 of the lithium transition metal oxide.

The proportion (amount) in which the rare earth compound is attached is preferably not less than 0.005 mass % and not more than 0.5 mass %, and more preferably not less than 0.05 mass % and not more than 0.3 mass % in terms of rare earth element relative to the total mass of the lithium transition metal oxide. If the proportion is excessively low, the amount of the rare earth compound attached to the recesses 23 in the lithium transition metal oxide is so small that the rare earth compound may fail to attain the aforementioned effects sufficiently. If, on the other hand, the proportion is excessively high, the rare earth compound will cover not only the recesses 23 but also the surface of the secondary particles 21 of the lithium transition metal oxide, and may cause a decrease in initial charge discharge characteristics.

The average particle size of the primary particles 20 of the lithium transition metal oxide is preferably not less than 100 nm and not more than 5 μm, and more preferably not less than 300 nm and not more than 2 μm. If the average particle size of the primary particles 20 is excessively small, too many interfaces of the primary particles will be formed on and within the secondary particles 21, and the primary particles may be easily broken by swelling and shrinkage of the positive electrode active material during charge discharge cycles. If, on the other hand, the average particle size is excessively large, the amount of interfaces of the primary particles on and within the secondary particles 21 is so reduced that the output, particularly at low temperature, may be reduced.

The average particle size of the secondary particles 21 of the lithium transition metal oxide is preferably not less than 2 μm and not more than 40 μm, and more preferably not less than 4 μm and not more than 20 μm. If the average particle size of the secondary particles 21 is excessively small, the packing density of the positive electrode active material is decreased and a sufficiently high capacity may not be attained at times. If, on the other hand, the average particle size is excessively large, a sufficient output may not be obtained, particularly at low temperature. Because the secondary particles 21 are formed by the primary particles 20 that are bonded (aggregated) together, there are no primary particles 20 larger than the secondary particles 21.

The average particle size was determined by observing the surface and cross sections of the active material particles with a scanning electron microscope (SEM) and measuring the size of, for example, several tens of particles for each type of particles. The average particle size of the primary particles of the rare earth compound means the size along the surface, not in the thickness direction, of the active material.

The median particle size (D50) of the secondary particles 21 of the lithium transition metal oxide is preferably not less than 3 μm and not more than 30 μm, and more preferably not less than 5 μm and not more than 20 μm. The median particle size (D50) may be measured by an optical diffraction scattering method. The median particle size (D50) means the particle size at 50% cumulative volume in the particle size distribution of the secondary particles 21, and is also referred to as the (volume-based) median diameter.

In the lithium transition metal oxide, the proportion of nickel (Ni) in the oxide is preferably not less than 80 mol % relative to the total molar amount of metal element(s) except lithium (Li). For example, this configuration makes it possible to increase the capacity of the positive electrode and facilitates the occurrence of proton exchange reaction at the interfaces of the primary particles 20 described later. The lithium transition metal oxide preferably includes, in addition to nickel (Ni), at least one of cobalt (Co), manganese (Mn) and aluminum (Al). Specific examples of preferred lithium transition metal oxides include lithium nickel manganese composite oxide, lithium nickel cobalt manganese composite oxide, lithium nickel cobalt composite oxide, and lithium nickel cobalt aluminum composite oxide. The lithium nickel cobalt aluminum composite oxide may have a composition in which the Ni:Co:Al molar ratio is, for example, 8:1:1, 82:15:3, 85:12:3, 87:10:3, 88:9:3, 88:10:2, 89:8:3, 90:7:3, 91:6:3, 91:7:2, 92:5:3 or 94:3:3. A single or a mixture of these oxides may be used.

When the lithium transition metal oxide has a Ni proportion (a Ni content) of not less than 80 mol %, the proportion of trivalent Ni is correspondingly high and consequently the proton exchange reaction of lithium in the lithium transition metal oxide with water is allowed to occur easily in water. A large amount of LiOH generated by the proton exchange reaction comes out of the inside to the surface of the particles of the lithium transition metal oxide. As a result, the alkali (OH$^-$) concentration between the primary particles 20 of the lithium transition metal oxide that are adjacent to one another on the surface of the secondary particles 21 of the lithium transition metal oxide becomes higher than its surrounding environment. The alkali present in the recesses 23 between the primary particles 20 attracts the primary particles 24 of the rare earth compound and facilitates their attachment to the recesses while they are aggregated into the secondary particles 25. When, in contrast, the lithium transition metal oxide has a Ni proportion of less than 80 mol %, the proportion of trivalent Ni is low and the proton exchange reaction is difficult to occur, and consequently the alkali concentration between the primary particles 20 is substantially the same as in its surrounding environment. Thus, even if the primary particles 24 of the rare earth compound that have precipitated bond together into secondary particles 25, such particles tend to be attached to portions (elevated portions) of the surface of the lithium transition metal oxide other than the recesses 23.

From points of view such as capacity enhancement, the proportion of Co in the lithium transition metal oxide is preferably not more than 7 mol %, and more preferably not more than 5 mol % relative to the total molar amount of metal element(s) except Li. In the presence of scarce Co, a structural change occurs more easily during charging and discharging and sometimes a breakage occurs easily at particle interfaces. In view of this fact, the suppressive effect on surface alteration is taken advantage of more prominently.

As mentioned above, Mg is dissolved in the lithium transition metal oxide. The concentration of Mg dissolved in the lithium transition metal oxide is preferably not less than 0.03 mol % and not more than 0.5 mol %, and more preferably not less than 0.05 mol % and not more than 0.3 mol % relative to the total molar amount of metal element(s) except Li. If the amount of dissolved Mg is excessively small, the element may fail to attain sufficiently its effect of suppressing alteration and breakage at interfaces of the primary particles 20 within the secondary particles 21. If, on the other hand, the amount of dissolved Mg is excessively large, the capacity per unit weight of the positive electrode active material tends to be decreased. While details will be described later, the presence or absence of dissolved Mg and the amount (concentration) in which it is dissolved in the lithium transition metal oxide may be determined by energy dispersive X-ray spectrometry (EDS), inductively coupled plasma (ICP) emission spectroscopy and SEM.

Mg in the lithium transition metal oxide may be dissolved uniformly over the entirety of the secondary particles 21, but is preferably enriched near the surface of the secondary particles 21. That is, the secondary particles 21 preferably have a distribution of the Mg concentration. By designing the lithium transition metal oxide so that the concentration of Mg dissolved therein is higher near the surface than near the core of the secondary particles 21, it is possible to efficiently suppress alteration and breakage at interfaces of the primary particles 20 near the surface of the secondary particles 21 which have a larger influence on the increase in DCR.

Specifically, it is preferable that the concentration of Mg dissolved in a skin region that extends from the surface of the secondary particle 21 of the lithium transition metal oxide to 20% of the particle size of the particle be higher than the concentration of Mg dissolved in the other region, namely, in the particle except the skin region. Mg may be present only in the skin region of the secondary particles 21 and may be substantially absent in the other region of the secondary particles 21. The other region of the secondary particles 21 is the region except the skin region, and extends from the position corresponding to 20% of the particle size to the core of the secondary particles 21 (hereinafter, the region is sometimes written as the "core region"). Here, the particle size of the secondary particle 21 was measured by circumscribing a circle on a particle imaged by SEM, and measuring the diameter of the circumscribed circle.

The concentration of Mg dissolved in the skin region is preferably not less than 0.03 mol % and not more than 0.5 mol %, more preferably not less than 0.05 mol % and not more than 0.4 mol %, and particularly preferably not less than 0.08 mol % and not more than 0.35 mol % relative to the total molar amount of metal element(s) except Li. When, for example, the amount (concentration) of Mg dissolved in the entirety of the secondary particles 21 is 0.03 mol %, it is preferable that the concentration of Mg dissolved in the skin region be above 0.03 mol %, and it is preferable that the concentration becomes higher toward the surface of the secondary particles 21. The concentration of Mg in the entirety of the secondary particles 21 is preferably not less than 0.03 mol % relative to the total molar amount of metal element(s) except Li. If the concentration of Mg dissolved in the skin region is excessively high, the amount of dissolved Mg is so large that the initial charge discharge capacity is decreased at times.

The concentration of Mg dissolved in the skin region may be measured (computed) by EDS and ICP emission spectroscopy. For example, the concentration of Mg dissolved in the skin region of the secondary particles 21 may be computed based on a Mg mapping image of a cross section of the secondary particle 21 obtained by EDS, and the Mg content determined by ICP emission spectroscopy.

An example method for dissolving Mg into the lithium transition metal oxide is to mix a magnesium compound with a compound(s) of lithium, nickel and the like followed by calcination (heat treatment) of the mixture, or to mix a magnesium compound with a lithium transition metal oxide followed by calcination of the mixture. By the former method, Mg can be dissolved uniformly in the entirety of the secondary particles 21. By the latter method, the concentration of Mg dissolved in the skin region of the secondary particles 21 can be increased as compared to the concentration of Mg dissolved in the core region. The calcination is preferably performed at a temperature of 500 to 700° C., and is carried out, for example, in an oxygen atmosphere or in the air. The magnesium compound is not particularly limited and may be, among others, magnesium hydroxide, magnesium oxide, magnesium sulfate or magnesium nitrate.

For purposes such as to obtain batteries with excellent high-temperature storage characteristics, the lithium transition metal oxide is preferably washed with water or the like to remove alkali components adhering to the surface of the lithium transition metal oxide.

An example method for attaching the rare earth compound to the surface of the secondary particles 21 of the lithium transition metal oxide is to add an aqueous solution of the rare earth compound to a suspension including the lithium transition metal oxide. During the addition of an aqueous solution of the rare earth compound to a suspension including the lithium transition metal oxide, the pH of the suspension is desirably controlled to the range of 11.5 and above, and preferably to the range of pH 12 and above. The treatment under such conditions tends to cause the particles of the rare earth compound to be unevenly distributed on the surface of the secondary particles 21. When, on the other hand, the pH of the suspension is controlled to the range of 6 to 10, the particles of the rare earth compound tend to be attached uniformly over the entire surface of the secondary particles 21. If the pH is below 6, at least part of the lithium transition metal oxide may be dissolved.

The pH of the suspension is desirably controlled to the range of 11.5 to 14, and particularly preferably to the range of pH 12 to 13. If the pH is above 14, the primary particles 24 of the rare earth compound may be excessively coarsened; further, an excessively large amount of alkalis may remain inside the particles of the lithium transition metal oxide to increase the risk of gelation of a positive electrode mixture slurry during its preparation, and may also adversely affect the storage stability of batteries.

When the aqueous solution of the rare earth compound that is added to the suspension including the lithium transition metal oxide is a simple aqueous solution, the rare earth is precipitated as the hydroxide. When the aqueous solution contains a sufficient amount of carbon dioxide dissolved therein, the rare earth is precipitated as the carbonate compound. When a sufficient amount of phosphate ions are added to the suspension, the rare earth compound that is precipitated on the surface of the lithium transition metal oxide particles is the phosphate compound of the rare earth. By controlling the types of ions dissolved in the suspension, for example, a rare earth compound that is a mixture of hydroxide and fluoride can be obtained.

The lithium transition metal oxide in which the rare earth compound has been attached to the surface is preferably heat treated. The heat treatment causes the rare earth compound to strongly adhere to interfaces of the primary particles 20 so as to attain enhancements in the suppressive effect on surface alteration which can occur at interfaces of the primary particles 20 and in the effect of bonding the primary particles 20 to one another, thus facilitating obtaining excellent DCR suppressive effects.

The lithium transition metal oxide in which the rare earth compound has been attached to the surface is preferably heat treated in vacuum. The water derived from the suspension used to attach the rare earth compound has penetrated to the inside of the particles of the lithium transition metal oxide. Because the secondary particles 25 of the rare earth compound have been attached to the recesses 23 in the lithium transition metal oxide, the inside water is inhibited from going out during drying. In view of this, the heat treatment is preferably performed in vacuum so that water can be removed efficiently. If the positive electrode active material carries an increased amount of water when it is installed into a battery, the water undergoes reaction with the nonaqueous electrolyte to form a product which can alter the quality of the surface of the active material.

The aqueous solution containing the rare earth compound may be a solution of the compound in the form of, for example, acetate salt, nitrate salt, sulfate salt, oxide or chloride in a water-based solvent. When, in particular, a rare earth oxide is used, the aqueous solution may be one which contains the sulfate salt, chloride or nitrate salt of the rare earth obtained by dissolving the oxide into an acid such as sulfuric acid, hydrochloric acid or nitric acid.

If the rare earth compound is attached to the surface of the secondary particles of the lithium transition metal oxide by a method where the lithium transition metal oxide and the rare earth compound are dry mixed, the particles of the rare earth compound tend to be attached randomly to the surface of the secondary particles of the lithium transition metal oxide. That is, it is difficult to attach the rare earth compound selectively to the recesses 23 in the lithium transition metal oxide. Further, the dry mixing method encounters a difficulty in strongly attaching the rare earth compound to the lithium transition metal oxide, and may fail to attain sufficient effects in fixing (bonding) the primary particles 20 to one another. Consequently, when, for example, the positive electrode active material particles are mixed together with components such as a conductive agent and a binder to give a positive electrode mixture, the rare earth compound may be detached easily from the lithium transition metal oxide.

The positive electrode active material is not limited to the above particles of the lithium transition metal oxide alone. The lithium transition metal oxide described above may be used as a mixture with other positive electrode active materials. Such additional positive electrode active materials are not particularly limited as long as the compounds allow lithium ions to be inserted therein and released therefrom reversibly. Examples thereof include active materials that allow lithium ions to be intercalated and deintercalated while maintaining a stable crystal structure, specifically, those materials having a layered structure such as lithium cobalt oxide and lithium nickel cobalt manganese oxide, those materials having a spinel structure such as lithium manganese oxide and lithium nickel manganese oxide, and those materials having an olivine structure. The positive electrode active material may have a single particle size or may be a mixture of particles with different sizes.

[Negative Electrodes]

For example, the negative electrode is composed of a negative electrode current collector such as a metallic foil, and a negative electrode mixture layer disposed on the current collector. The negative electrode current collector may be, for example, a foil of a metal that is stable at negative electrode potentials such as copper, or a film having a skin layer of such a metal. The negative electrode mixture layer includes a negative electrode active material, and preferably further includes a binder. The negative electrode may be fabricated by, for example, applying a negative electrode mixture slurry including the negative electrode active material and other components such as a binder onto a negative electrode current collector, and drying and rolling the wet films so as to form negative electrode mixture layers on both sides of the current collector.

The negative electrode active material is not particularly limited as long as it can reversibly store and release lithium ions. Examples include carbon materials such as natural graphite and artificial graphite, metals which can be alloyed with lithium such as silicon (Si) and tin (Sn), and alloys and composite oxides containing metal elements such as Si and Sn. The negative electrode active materials may be used singly, or two or more may be used in combination.

Examples of the binders include, similarly to those in the positive electrodes, fluororesins, PAN, polyimide resins, acrylic resins and polyolefin resins. When the mixture slurry is prepared using an aqueous solvent, it is preferable to use, among others, CMC or a salt thereof (such as CMC-Na, CMC-K or CMC-$NH_4$, or a partially neutralized salt), styrene-butadiene rubber (SBR), polyacrylic acid (PAA) or a salt thereof (such as PAA-Na or PAA-K, or a partially neutralized salt), or polyvinyl alcohol (PVA).

[Separators]

As the separator, a porous sheet having ion permeability and insulating properties is used. Specific examples of the porous sheets include microporous thin films, woven fabrics and nonwoven fabrics. Some preferred materials of the separators are polyolefin resins such as polyethylene and polypropylene, and celluloses. The separator may be a stack having a cellulose fiber layer and a thermoplastic resin fiber layer such as of a polyolefin resin. Alternatively, the separator may be a multilayered separator including a polyethylene layer and a polypropylene layer, or may be one having a coating of an aramid resin or the like on the surface of the separator.

A filler layer including an inorganic filler may be disposed in the interface of the separator and at least one of the positive electrode and the negative electrode. Examples of the inorganic fillers include oxides containing at least one of titanium (Ti), aluminum (Al), silicon (Si) and magnesium (Mg), and phosphoric acid compounds containing at least one of titanium (Ti), aluminum (Al), silicon (Si) and magnesium (Mg), wherein the surface of these compounds may be treated with hydroxides or the like. For example, the filler layer may be formed by applying a slurry containing the filler onto the surface of the positive electrode, the negative electrode or the separator.

[Nonaqueous Electrolytes]

The nonaqueous electrolyte includes a nonaqueous solvent and a solute dissolved in the nonaqueous solvent. Examples of the nonaqueous solvents include esters, ethers, nitriles, amides such as dimethylformamide, isocyanates such as hexamethylenediisocyanate, and mixed solvents including two or more of these solvents. The nonaqueous solvent may include a halogenated compound resulting from the substitution of any of the above solvents with halogen atoms such as fluorine in place of at least part of the hydrogen atoms.

Examples of the esters include cyclic carbonate esters such as ethylene carbonate (EC), propylene carbonate (PC)

and butylene carbonate, chain carbonate esters such as dimethyl carbonate (DMC), methyl ethyl carbonate (EMC), diethyl carbonate (DEC), methyl propyl carbonate, ethyl propyl carbonate and methyl isopropyl carbonate, cyclic carboxylate esters such as γ-butyrolactone and γ-valerolactone, and chain carboxylate esters such as methyl acetate, ethyl acetate, propyl acetate, methyl propionate (MP) and ethyl propionate.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole and crown ethers, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether and tetraethylene glycol dimethyl.

Examples of the nitriles include acetonitrile, propionitrile, butyronitrile, valeronitrile, n-heptanitrile, succinonitrile, glutaronitrile, adiponitrile, pimelonitrile, 1,2,3-propanetricarbonitrile and 1,3,5-pentanetricarbonitrile.

Some preferred halogenated compounds are fluorinated cyclic carbonate esters such as fluoroethylene carbonate (FEC), fluorinated chain carbonate esters, and fluorinated chain carboxylate esters such as fluoromethyl propionate (FMP).

The solute may be any known solute that is conventionally used. Examples include fluorine-containing lithium salts such as $LiPF_6$, $LiBF_4$, $LiCF_3SO_3$, $LiN(FSO_2)_2$, $LiN(CF_3SO_2)_2$, $LiN(C_2F_5SO_2)_2$, $LiN(CF_3SO_2)(C_4F_9SO_2)$, $LiC(C_2F_5SO_2)_3$ and $LiAsF_6$. Further, a lithium salt other than fluorine-containing lithium salts [a lithium salt containing one or more elements of P, B, O, S, N and Cl (such as, for example, $LiClO_4$)] may be added to the fluorine-containing lithium salt. In particular, it is preferable that the solute include a fluorine-containing lithium salt and a lithium salt having an oxalato complex as the anion because such a solute forms a film on the negative electrode surface which is stable even under high-temperature conditions.

Examples of the lithium salts having an oxalato complex as the anion include LiBOB [lithium-bisoxalatoborate], $Li[B(C_2O_4)F_2]$, $Li[P(C_2O_4)F_4]$ and $Li[P(C_2O_4)_2F_2]$. In particular, it is preferable to use LiBOB, which can form a very stable film on the negative electrode. The solutes may be used singly, or two or more may be used in combination.

An overcharge inhibitor may be added to the nonaqueous electrolyte. For example, cyclohexylbenzene (CHB) may be used. Further, use may be made of benzene derivatives such as benzene, biphenyl, alkylbiphenyls, for example, 2-methylbiphenyl, terphenyl, partially hydrogenated terphenyl, naphthalene, toluene, anisole, cyclopentylbenzene, t-butylbenzene and t-amylbenzene, phenyl ether derivatives such as phenyl propionate and 3-phenylpropyl acetate, and halides of these compounds. These compounds may be used singly, or two or more may be used in combination.

EXPERIMENTAL EXAMPLES

Hereinbelow, the present disclosure will be described in greater detail based on experimental examples. The scope of the present disclosure is not limited to such experimental examples.

First Experimental Examples

Experimental Example 1

[Preparation of Positive Electrode Active Material]

LiOH and an oxide obtained by heat treating coprecipitated nickel cobalt aluminum composite hydroxide represented by $Ni_{0.91}Co_{0.06}Al_{0.03}(OH)_2$ at 500° C. were mixed together using an Ishikawa-type grinder mortar in a molar ratio of Li to the transition metals of 1.05:1. Next, the resultant mixture was heat treated at 760° C. for 20 hours in an oxygen atmosphere and was thereafter crushed. As a result, particles of lithium nickel cobalt aluminum composite oxide (lithium transition metal oxide) represented by $Li_{1.05}Ni_{0.91}Co_{0.06}Al_{0.03}O_2$ which had an average secondary particle size of about 11 μm were obtained.

1000 g of the lithium transition metal oxide particles were provided. The particles were added to 1.5 L of pure water and the mixture was stirred to give a suspension of the lithium transition metal oxide dispersed in pure water. Next, a 0.1 mol/L aqueous erbium sulfate solution obtained by dissolving erbium oxide into sulfuric acid, and a 1.0 mol/L aqueous magnesium sulfate solution were added in several portions to the suspension. During the addition of the aqueous erbium sulfate solution to the suspension, the pH of the suspension was 11.5 to 12.0. Next, the suspension was filtered, and the powder obtained was washed with pure water, dried in vacuum at 200° C. and heat treated in an oxygen atmosphere at 600° C. A positive electrode active material was thus prepared. The median particle size (D50, volume-basis) of the positive electrode active material particles was about 10 μm (measured with LA920 manufactured by HORIBA, Ltd.).

The surface of the positive electrode active material obtained was observed with SEM. The observation confirmed that primary particles of the erbium compound having an average particle size of 20 to 30 nm had been aggregated into secondary particles of the erbium compound with an average particle size of 100 to 200 nm, and the secondary particles had been attached to the surface of secondary particles of the lithium transition metal oxide. The observation also confirmed that most of the secondary particles of the erbium compound had been attached to the recesses formed between the primary particles of the lithium transition metal oxide that were adjacent to one another on the surface of the secondary particles of the lithium transition metal oxide, and that the secondary particles that had been attached were in contact with both of the primary particles adjacent to each other in the recess. The amount of the erbium compound attached was measured by ICP emission spectroscopy to be 0.15 mass % in terms of erbium element relative to the lithium nickel cobalt aluminum composite oxide.

Deposits that seemed to be the magnesium compound were substantially absent on the surface of the secondary particles of the lithium transition metal oxide. EDS elemental mapping of a cross section of the secondary particle showed that Mg was present in the inside of the primary particles of the lithium transition metal oxide. Mg was particularly enriched in the region from the surface to a depth of 2 μm of the secondary particle. The particle size of the secondary particle (the diameter of a circle circumscribed on the particle in the SEM image) was about 10 μm. The Mg concentration was measured by ICP emission spectroscopy to be 0.1 mol % relative to the total molar amount of metal element(s) except Li. From the depth up to which Mg was found by the elemental mapping and the Mg concentration measured by ICP emission spectroscopy, the Mg concentration in the skin region of the secondary particle (the region from the surface to a depth of 2 μm of the secondary particle) was calculated to be 0.17 mol %.

Because the pH of the suspension in EXPERIMENTAL EXAMPLE 1 was high at 11.5 to 12.0, it is probable that the primary particles of erbium hydroxide precipitated in the suspension bonded (aggregated) to one another into secondary particles. Further, because the proportion of Ni in EXPERIMENTAL EXAMPLE 1 was as high as 91% and consequently the proportion of trivalent Ni was high, the proton exchange between $LiNiO_2$ and $H_2O$ was facilitated to occur at interfaces of the primary particles of the lithium transition metal oxide, and a large amount of LiOH generated by the proton exchange reaction came out of the inside of the interfaces of the adjacent primary particles exposed on the surface of the secondary particles of the lithium transition metal oxide. As a result, the alkali concentration between the primary particles adjacent to one another on the surface of the lithium transition metal oxide was increased. It is therefore probable that the erbium hydroxide particles were precipitated in the suspension and formed secondary particles by being aggregated to the recesses present at interfaces of the primary particles just like the particles were attracted by the alkali.

The precipitation of magnesium does not respond to alkali concentration as sharply as erbium, and thus magnesium tends to be precipitated uniformly over the surface of the secondary particles of the lithium transition metal oxide. SEM observation of the particles before heat treatment confirmed that the magnesium compound had been precipitated uniformly on the surface of the secondary particles. In contrast, most of the magnesium compound uniformly precipitated on the surface of the secondary particles was not seen on the surface in the observation of the particles after heat treatment (calcination). This probably shows that most of Mg was diffused and dissolved into the inside of the particles.

[Fabrication of Positive Electrode]

Carbon black and an N-methyl-2-pyrrolidone solution of polyvinylidene fluoride were weighed in such amounts that the mass ratio of the positive electrode active material particles to the conductive agent and the binder would be 100:1:1. These components and the positive electrode active material particles were kneaded together with use of T. K. HIVIS MIX (manufactured by PRIMIX Corporation) to give a positive electrode mixture slurry.

Next, the positive electrode mixture slurry was applied to both sides of a positive electrode current collector composed of an aluminum foil, and the wet films were dried and rolled with a roller. A current collector tab made of aluminum was connected to the current collector. A positive electrode plate was thus fabricated which had the positive electrode mixture layers on both sides of the positive electrode current collector. The packing density of the positive electrode active material in the positive electrode was 3.60 g/cm$^3$.

[Fabrication of Negative Electrode]

Artificial graphite as a negative electrode active material, CMC (carboxymethylcellulose sodium) and SBR (styrene-butadiene rubber) were mixed together in a mass ratio of 100:1:1 in an aqueous solution to give a negative electrode mixture slurry. Next, the negative electrode mixture slurry was applied uniformly to both sides of a negative electrode current collector composed of a copper foil, and the wet films were dried and rolled with a roller. A current collector tab made of nickel was connected to the current collector. A negative electrode plate was thus fabricated which had the negative electrode mixture layers on both sides of the negative electrode current collector. The packing density of the negative electrode active material in the negative electrode was 1.75 g/cm$^3$.

[Preparation of Nonaqueous Electrolytic Solution]

Ethylene carbonate (EC), methyl ethyl carbonate (MEC) and dimethyl carbonate (DMC) were mixed in a volume ratio of 2:2:6. Lithium hexafluorophosphate ($LiPF_6$) was dissolved into the mixed solvent so that its concentration would be 1.3 mol/L, and thereafter vinylene carbonate (VC) was dissolved into the mixed solvent so that its concentration would be 2.0 mass %.

[Fabrication of Battery]

The positive electrode and the negative electrode obtained above were wound into a coil via a separator between the electrodes. The winding core was pulled out, and a wound electrode assembly was obtained. Next, the wound electrode assembly was pressed into a flat electrode assembly. Thereafter, the flat electrode assembly and the nonaqueous electrolytic solution were inserted into an exterior case made of an aluminum laminate. Battery A1 was thus fabricated. The size of the battery was 3.6 mm in thickness, 35 mm in width and 62 mm in length. The nonaqueous electrolyte secondary battery was charged to 4.20 V and discharged to 3.0 V, and the discharge capacity during this process was 950 mAh.

Experimental Example 2

Battery A2 was fabricated in the same manner as in EXPERIMENTAL EXAMPLE 1, except that the aqueous magnesium sulfate solution was not added during the preparation of the positive electrode active material.

Experimental Example 3

A positive electrode active material was prepared and Battery A3 was fabricated using the positive electrode active material in the same manner as in EXPERIMENTAL EXAMPLE 1, except that in the preparation of the positive electrode active material, the pH of the suspension was kept constant at 9 during the addition of the aqueous erbium sulfate solution to the suspension. The suspension was controlled to pH 9 by appropriate addition of a 10 mass % aqueous sodium hydroxide solution.

The surface of the positive electrode active material obtained was observed by SEM. The observation showed that the primary particles of erbium hydroxide having an average particle size of 10 nm to 50 nm did not form secondary particles and had been uniformly dispersed and attached as such to the entire surface (to elevated portions and to recesses) of the secondary particles of the lithium transition metal oxide. The amount of the erbium compound attached was measured by ICP emission spectroscopy to be 0.15 mass % in terms of erbium element relative to the lithium nickel cobalt aluminum composite oxide.

It is probable that in EXPERIMENTAL EXAMPLE 3, particles of erbium hydroxide were precipitated at a lowered rate in the suspension due to the pH of the suspension being 9 and consequently the erbium hydroxide particles, without forming secondary particles, were precipitated uniformly over the entire surface of the secondary particles of the lithium transition metal oxide.

Experimental Example 4

Battery A4 was fabricated in the same manner as in EXPERIMENTAL EXAMPLE 3, except that the aqueous magnesium sulfate solution was not added during the preparation of the positive electrode active material.

Experimental Example 5

A positive electrode active material was prepared and Battery A5 was fabricated using the positive electrode active material in the same manner as in EXPERIMENTAL EXAMPLE 1, except that in the preparation of the positive electrode active material, the aqueous erbium sulfate solution was not added and thus no erbium hydroxide was attached to the surface of the secondary particles of the lithium transition metal oxide.

Experimental Example 6

Battery A6 was fabricated in the same manner as in EXPERIMENTAL EXAMPLE 5, except that the aqueous magnesium sulfate solution was not added during the preparation of the positive electrode active material.

Experimental Example 7

Battery A7 was fabricated in the same manner as in EXPERIMENTAL EXAMPLE 1, except that in the preparation of the positive electrode active material, the Mg content was controlled to 0.03 mol % relative to the total molar amount of metal element(s) except Li in the lithium transition metal oxide. The Mg concentration in the skin region of the secondary particle (the region from the surface to a depth of 2 μm of the secondary particle) was measured in the same manner as in EXPERIMENTAL EXAMPLE 1, and the Mg concentration was determined to be 0.05 mol %.

[Measurement of DCR]

The batteries were each tested under the following conditions to measure DCR before charge discharge cycles and after 100 cycles.

<Measurement of DCR Before Cycles>

The battery was charged at a current of 475 mA to 100% SOC. While keeping the battery voltage constant at the voltage at which SOC (state of charge) had reached 100%, the battery was charged until the current value reached 30 mA. After the completion of charging, the battery was allowed to rest for 120 minutes and the open circuit voltage (OCV) was measured. The battery was then discharged at 475 mA for 10 seconds, and the voltage after 10 seconds of discharging was measured. DCR before cycles (100% SOC) was calculated using the following equation (1).

DCR (Ω)=(OCV (V) after 120 minutes of rest−Voltage (V) after 10 seconds of discharging)/(Current value (A))  (1)

Thereafter, a cycle of charging and discharging under the following conditions was repeated 150 times. The interval of time between the measurement of DCR before cycles and the charge discharge cycle test was 10 minutes.

<Charge Discharge Cycle Test>

Charging Conditions

The battery was charged at a constant current of 475 mA until the battery voltage reached 4.2 V (the positive electrode potential reached 4.3 V versus lithium). After the battery voltage had reached 4.2 V, the battery was charged at a constant voltage of 4.2 V until the current value reached 30 mA.

Discharging Conditions

The battery was discharged at a constant current of 950 mA until the battery voltage reached 3.0 V.

Rest Conditions

The interval of time between the charging and the discharging was 10 minutes.

<Measurement of DCR after 150 Cycles>

The value of DCR after 150 cycles was measured in the same manner as DCR had been measured before the cycles. The interval of time between the charge discharge cycle test and the measurement of DCR after cycles was 10 minutes. The measurement of DCR and the charge discharge cycle test were both carried out in a thermostatic chamber at 45° C.

[Calculation of DCR Increase Ratio]

The ratio of the increase in DCR after 150 cycles was calculated using the following equation (2). The results are described in Table 1.

DCR increase ratio (100% SOC)=(DCR after 150 cycles (100% SOC))/(DCR before cycles (100% SOC))×100  (2)

TABLE 1

| Battery | Rare earth element | Manner in which rare earth compound was attached | Amount of dissolved Mg (mol %) | DCR increase ratio (%) |
|---|---|---|---|---|
| A1 | Er | Aggregated in recesses | 0.1 | 37 |
| A2 | Er | Aggregated in recesses | 0 | 44 |
| A3 | Er | Uniformly dispersed | 0.1 | 50 |
| A4 | Er | Uniformly dispersed | 0 | 51 |
| A5 | None | — | 0.1 | 48 |
| A6 | None | — | 0 | 49 |
| A7 | Er | Aggregated in recesses | 0.03 | 38 |

Battery A1 will be discussed below. In the positive electrode active material of Battery A1, the secondary particles of the rare earth compound were attached to both primary particles of the lithium transition metal oxide that were adjacent to each other in the recesses (see FIG. 3). Because of this, the surface of every primary particles was probably prevented from surface alteration and breakage at interfaces of the primary particles during the charge discharge cycles. In addition, the secondary particles of the rare earth compound has an effect of fixing (bonding) together the primary particles that constitute the lithium transition metal oxide. Because of this, the primary particles were probably prevented from breakage at their interfaces in the recesses in the lithium transition metal oxide.

Further, the positive electrode active material of Battery A1 contained Mg dissolved in the lithium transition metal oxide. Because of this, the primary particles present inside the particles of the lithium transition metal oxide were probably prevented from alteration and breakage at their interfaces.

In Battery A1, the positive electrode active material was prevented from surface alteration and breakage both on the surface and in the inside of the positive electrode active material. Probably because of this, the ratio of DCR increase after charge discharge cycles was reduced. Battery A1 attained a marked enhancement in the reduction of the DCR increase ratio by the synergetic effect of the secondary particles of the rare earth compound attached to the recesses in the lithium transition metal oxide, in combination with Mg dissolved in the lithium transition metal oxide.

Figure 4:
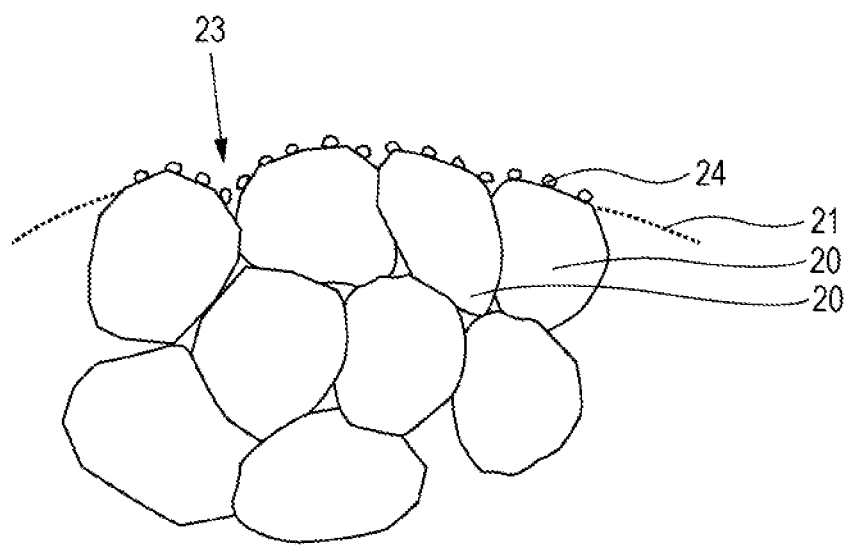
FIG. 4 is an enlarged sectional view of part of a conventional positive electrode active material particle.
Figure 5:
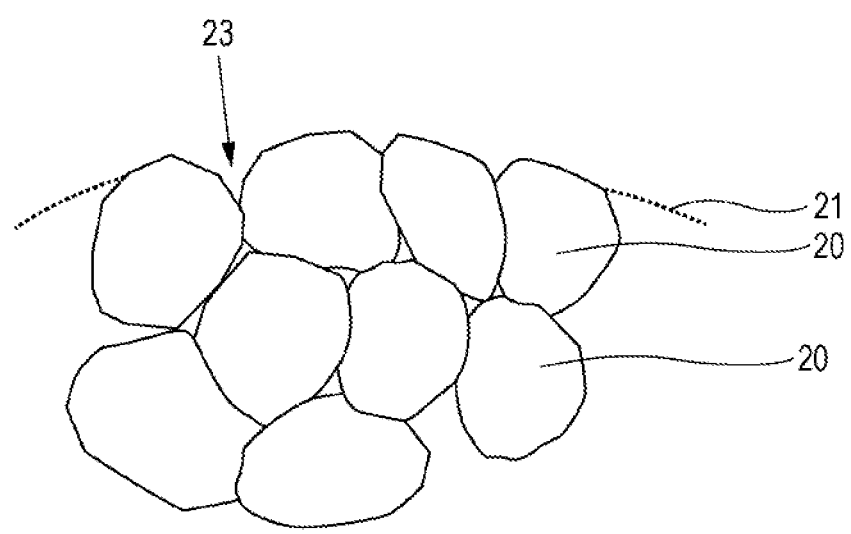
FIG. 5 is an enlarged sectional view of part of a conventional positive electrode active material particle.

Batteries A3 and A5 will be discussed below. As illustrated in FIG. 4, the positive electrode active material used in Battery A3 was such that the primary particles 24 of the rare earth compound were attached, without forming secondary particles, uniformly over the entire surface of the secondary particles 21 of the lithium transition metal oxide. In the positive electrode active material used in Battery A5, as illustrated in FIG. 5, no rare earth compounds were attached to the surface of the secondary particles 21 of the lithium transition metal oxide.

In Batteries A3 and A5, the recesses 23 in the lithium transition metal oxide were free from attachment of secondary particles of the rare earth compound. Because of this, it was probably impossible to prevent surface alteration of the primary particles 20 forming the recesses 23, and to prevent breakage at interfaces of the primary particles. Although the positive electrode active materials of Batteries A3 and A5 contained dissolved Mg, the increase in DCR is more greatly affected by the deterioration of the surface of the secondary particles than by the deterioration of the inside of the secondary particles. Probably because of this, these batteries showed a higher DCR increase ratio than Battery A1.

Batteries A2, A4 and A6 will be discussed. The positive electrode active materials of Batteries A2, A4 and A6 were different from the positive electrode active materials of Batteries A1, A3 and A5, respectively, in that Mg was not dissolved therein.

In Battery A2, the secondary particles of the rare earth compound were attached to both primary particles that were adjacent to each other in the recesses in the lithium transition metal oxide. Because of this, for the same reasons as described above in connection with Battery A1, the surface of every primary particles forming the recesses was probably prevented from surface alteration and breakage at interfaces of the primary particles. In Battery A2, however, the absence of dissolved Mg in the positive electrode active material resulted in a failure to suppress deterioration and breakage at interfaces of the primary particles in the inside of the secondary particles, in particular, near the surface of the secondary particles. Probably because of this, Battery A2 suffered an increase in positive electrode resistance and showed a higher DCR increase ratio than Battery A1.

In Batteries A4 and A6, there were no secondary particles of the rare earth compound attached to the recesses in the lithium transition metal oxide, and consequently it was impossible to suppress surface alteration of the primary particles 20 forming the recesses, and to suppress breakage at interfaces of the primary particles. In addition, Batteries A4 and A6 did not have Mg dissolved in the positive electrode active material. These absences resulted in a failure to suppress alteration and breakage at interfaces of the primary particles both on the surface and in the inside of the secondary particles. Probably because of this, Batteries A4 and A6 suffered a larger increase in positive electrode resistance than Battery A2 and showed a still higher ratio of DCR increase after charge discharge cycles.

Mg was used in Battery A7 and effectively prevented alteration and breakage at interfaces of the primary particles in the inside of the particles, although the amount thereof was smaller than in Battery A1 and thus the suppressive effect was smaller than that obtained in Battery A1. Probably because of this, the DCR increase ratio was substantially equal to that of Battery A1.

Second Experimental Examples

While FIRST EXPERIMENTAL EXAMPLES involved erbium as the rare earth element, SECOND EXPERIMENTAL EXAMPLES studied batteries using samarium or neodymium as the rare earth element.

Experimental Example 8

A positive electrode active material was prepared and Battery A8 was fabricated using the positive electrode active material in the same manner as in EXPERIMENTAL EXAMPLE 1, except that in the preparation of the positive electrode active material, the aqueous erbium sulfate solution was replaced by an aqueous samarium sulfate solution. The amount of the samarium compound attached was measured by ICP emission spectroscopy to be 0.13 mass % in terms of samarium element relative to the lithium nickel cobalt aluminum composite oxide. The Mg concentration in the skin region of the secondary particle (the region from the surface to a depth of 2 μm of the secondary particle) was measured in the same manner as in EXPERIMENTAL EXAMPLE 1, and the Mg concentration was determined to be 0.17 mol %.

Experimental Example 9

A positive electrode active material was prepared and Battery A9 was fabricated using the positive electrode active material in the same manner as in EXPERIMENTAL EXAMPLE 1, except that in the preparation of the positive electrode active material, the aqueous erbium sulfate solution was replaced by a neodymium sulfate solution. The amount of the neodymium compound attached was measured by ICP emission spectroscopy to be 0.13 mass % in terms of neodymium element relative to the lithium nickel cobalt aluminum composite oxide. The Mg concentration in the skin region of the secondary particle (the region from the surface to a depth of 2 μm of the secondary particle) was measured in the same manner as in EXPERIMENTAL EXAMPLE 1, and the Mg concentration was determined to be 0.17 mol %.

With respect to Batteries A8 and A9, the ratio of DCR increase after 150 cycles was calculated under the same conditions as in FIRST EXPERIMENTAL EXAMPLES.

TABLE 2

| Battery | Rare earth element | Manner in which rare earth compound was attached | Amount of dissolved Mg (mol %) | DCR increase ratio (%) |
|---|---|---|---|---|
| A1 | Er | Aggregated in recesses | 0.1 | 37 |
| A8 | Sm | Aggregated in recesses | 0.1 | 39 |
| A9 | Nd | Aggregated in recesses | 0.1 | 38 |

As apparent from Table 2, the DCR increase ratio is reduced also when erbium is replaced by samarium or neodymium that similarly belongs to the rare earth elements. It is therefore believed that the DCR increase ratio will be reduced similarly even when a rare earth element other than erbium, samarium and neodymium is used.

INDUSTRIAL APPLICABILITY

The present invention can be applied to nonaqueous electrolyte secondary batteries.

REFERENCE SIGNS LIST 1 positive electrode
2 negative electrode
3 separator
4 positive electrode current collector tab
5 negative electrode current collector tab
6 aluminum laminate case
7 closed portion
11 nonaqueous electrolyte secondary battery
20 primary particle of lithium transition metal oxide (primary particle)
21 secondary particle of lithium transition metal oxide (secondary particle)
23 recess
24 primary particle of rare earth compound (primary particle)
25 secondary particle of rare earth compound (secondary particle)

The invention claimed is:

1. A nonaqueous electrolyte secondary battery comprising a positive electrode, a negative electrode and a nonaqueous electrolyte, wherein
the positive electrode comprises a positive electrode active material that consists essentially of:
a plurality of secondary particles formed by aggregation of primary particles of a lithium transition metal oxide, and
a plurality of secondary particles formed by aggregation of primary particles of a rare earth compound;
on a surface of each of the plurality of the secondary particles of the lithium transition metal oxide, a corresponding secondary particle of the rare earth compound is attached to a recess formed between adjacent primary particles of the lithium transition metal oxide in such a manner that the corresponding secondary particle of the rare earth compound is attached to each of the primary particles forming the recess;
the lithium transition metal oxide includes magnesium dissolved therein;
the concentration of magnesium dissolved in a region that extends from the surface of the secondary particle of the lithium transition metal oxide to 20% of the particle size of the particle is higher than the concentration of magnesium dissolved in the particle except the region; and
an average particle size of the secondary particle of the rare earth compound is not less than 100 nm and not more than 400 nm.

2. The nonaqueous electrolyte secondary battery according to claim 1, wherein the corresponding secondary particle of the rare earth compound is directly attached to both of the adjacent primary particles forming the recess.

3. The nonaqueous electrolyte secondary battery according to claim 1, wherein the concentration of magnesium dissolved in the lithium transition metal oxide is not less than 0.03 mol % and not more than 0.5 mol % relative to the total molar amount of metal element(s) except lithium.

4. The nonaqueous electrolyte secondary battery according to claim 1, wherein the concentration of magnesium dissolved in the region is not less than 0.03 mol % and not more than 0.5 mol % relative to the total molar amount of metal element(s) except lithium.

5. The nonaqueous electrolyte secondary battery according to claim 1, wherein an average particle size of the corresponding secondary particle of the rare earth compound is not less than 150 nm and not more than 300 nm.

6. The nonaqueous electrolyte secondary battery according to claim 1, wherein at least one rare earth element selected from neodymium, samarium and erbium constitutes the rare earth compound.

7. The nonaqueous electrolyte secondary battery according to claim 1, wherein a proportion of nickel in the lithium transition metal oxide is not less than 80 mol % relative to the total molar amount of metal element(s) except lithium.

8. The nonaqueous electrolyte secondary battery according to claim 1, wherein a proportion of cobalt in the lithium transition metal oxide is not more than 7 mol % relative to the total molar amount of metal element(s) except lithium.

* * * * *